(12) United States Patent
Logan

(10) Patent No.: US 6,227,252 B1
(45) Date of Patent: May 8, 2001

(54) REINFORCED PIPE AND METHOD OF MAKING

(75) Inventor: William Allan Dempster Logan, Aberdeen (GB)

(73) Assignee: Mobil Oil Corporation, Fairfax, VA (US)

(*) Notice: Subject to any disclaimer, the term of this patent is extended or adjusted under 35 U.S.C. 154(b) by 0 days.

(21) Appl. No.: 09/410,946

(22) Filed: Oct. 4, 1999

Related U.S. Application Data

(60) Provisional application No. 60/115,827, filed on Jan. 14, 1999.

(51) Int. Cl.⁷ .................................................. F16L 9/00
(52) U.S. Cl. ........................ 138/172; 138/115; 138/148
(58) Field of Search ................................. 138/114, 148, 138/113, 115, 172

(56) References Cited

U.S. PATENT DOCUMENTS

| | | | |
|---|---|---|---|
| 1,677,714 | 7/1928 | Frease | 138/115 |
| 3,307,361 | 3/1967 | Waterman | 138/148 X |
| 3,337,822 | 8/1967 | Hahne | 138/143 X |
| 3,608,640 | 9/1971 | Willhite et al. | 166/380 |
| 3,779,282 | 12/1973 | Klees | 138/115 X |
| 3,905,775 | * 9/1975 | Sowards et al. | 138/108 X |
| 3,992,237 | * 11/1976 | Gerholt et al. | 138/149 X |
| 4,116,009 | 9/1978 | Daublin | 138/112 X |
| 4,161,231 | 7/1979 | Wilkinson | 181/292 |
| 4,162,093 | * 7/1979 | Sigmund | 138/114 X |
| 4,404,992 | * 9/1983 | Sasaki et al. | 138/149 X |
| 4,431,469 | * 2/1984 | Falcomato | 138/113 X |
| 4,461,323 | 7/1984 | Morikawa et al. | 138/115 |
| 4,972,759 | 11/1990 | Nelson | 122/494 |
| 5,005,531 | 4/1991 | Nelson | 122/494 |
| 5,765,598 | 6/1998 | Goddard et al. | 138/115 |

* cited by examiner

Primary Examiner—Patrick Brinson

(57) ABSTRACT

A reinforced pipe and a method for constructing same wherein the reinforced pipe is comprised of an outer pipe concentrically positioned over an inner pipe. A honeycomb, reinforcing material which is comprised of rows of cells is positioned between the pipes with the longitudinal axis of each cell being aligned with a radius of the inner pipe. The outer pipe may be heat shrunk onto the honeycomb material or it may be split and expanded before positioning over the honeycomb material. Both the honeycomb material and the outer pipe are positioned along only a portion of the length of the inner pipe so that each end of the inner pipe is exposed to facilitate the joining of two adjacent lengths of reinforced pipe.

13 Claims, 2 Drawing Sheets

REINFORCED PIPE AND METHOD OF MAKING

CROSS-REFERENCE TO EARLIER APPLICATION

The present application claims the priority of Provisional Patent Application Ser. No. 60/115,827, filed Jan. 14, 1999.

DESCRIPTION

1. Technical Field

The present invention relates to a reinforced pipe and method for making same and in one aspect relates to a reinforced pipe comprised of two concentrically positioned pipes having a honeycombed, reinforcement material therebetween wherein said reinforced pipe is capable of withstanding the high external pressures nominally encountered where the reinforced pipe is used to construct a submerged pipeline for transporting gas in deep water environs.

2. Background

As is well known, large volumes of natural gas (i.e. primarily methane) are produced from submerged wells which lie in varying depths of water throughout the world. This gas has significant commercial value if it can be economically transported to market. Where the situation permits, submerged pipelines are laid along the marine bottom from the producing well(s) to the shore or to a collection riser which, in turn, brings the produced fluids to the surface for further handling. In relatively shallow depths, e.g. 2000 feet or less, a heavy, single-wall, large-diameter pipe is routinely used to construct such submerged, gas pipelines. However, as exploration and development efforts move into deeper and deeper waters, the use of such single-wall pipe for submerged pipelines becomes more and more limited.

For example, hydrocarbon deposits are now known to exist in subsea reservoirs which lie under extreme water depths; i.e. 6000 feet or more. However, the hydrostatic head at these depths (e.g. 3000 psi at 6600 feet) will collapse most single-wall pipes now commonly used in submerged pipeline construction unless a substantially equal internal pressure (e.g. 3000 psi) is maintained within the pipeline. Unfortunately, this is not always possible since these deepwater pipelines must be vented down to ambient pressure (e.g. about 15 psi) at various times during operation whereupon most, if not all, single-walled, submerged pipelines of the type now commonly used would collapse due the large differential between the internal and external pressures being applied on the pipe.

Also, for any deep water pipeline to be practical, it must be capable of being installed from existing lay barges using the "J-lay" or similar method. While theoretically it may be possible to build a single-walled, large diameter pipe having a wall thickness great enough to resist collapse under the high differential pressures encountered during installation and operation in deep water, the size and weight of such a pipe would be so great as to make its use impractical. That is, for any pipe to withstand the external pressures at these extreme water depths, the thickness of the pipe wall will have to be in excess of about 3.75 inches. This, in turn, requires that every joint of such pipe to be post-weld, heat-treated. Such a process would take in excess of 24 hours per weld thereby making use of such pipe impractical and commercially unacceptable, especially where the submerged line is to be several miles long.

Accordingly, for a pipe to find practical use in deep water environments, the wall thickness of the pipe must be less than 1.25 inches to avoid the need for post-weld heat treatment. Also, the pipe has to be light enough in weight to be installed from existing lay barges after the barges have had only minor modifications.

SUMMARY OF THE INVENTION

The present invention provides a reinforced pipe capable of withstanding large differentials in external and internal pressure which is especially useful in constructing pipelines which, in turn, are to be submerged in great water depths and a method for constructing said reinforced pipe and for joining two lengths thereof together.

More specifically, a length of the reinforced pipe in accordance with the present invention is comprised of a length of an outer pipe concentrically positioned over a length of inner pipe to form an annulus there between. A honeycomb, reinforcing material which is comprised of rows of cells is positioned in the annulus with the longitudinal axis of each cell being aligned with a radius of said inner pipe. The reinforced pipe may be constructed in number using different techniques.

For example, the outer pipe may be heated to expand its inner diameter before it is positioned over the honeycomb material, the outer pipe is then allowed to cool to shrink into contact the honeycomb material to tightly contain the honeycomb material within the annulus. Another technique involves splitting the outer pipe along one side to open a seam therein. The outer pipe is then spread to effectively increase its inner diameter before it is fitted over the honeycomb material. The outer pipe is then allowed to return to its original configuration and the seam is closed by welding or the like to tightly contain the honeycomb material within the annulus between the inner and outer pipes.

Preferably, the honeycomb material is positioned along only a portion of the length of the inner pipe and the length of the outer pipe is shorter than the length of the inner pipe so that each end of the inner pipe of each length of joint of reinforced pipe is bare and exposed. In joining two adjacent lengths of the reinforced pipe together, the respective exposed ends of the two lengths are abutted and joined together by welding or the like. Additional honeycomb material is positioned around the joined, exposed ends and extends between the ends of the honeycomb material on the respective lengths of reinforced pipes.

A short length of additional outer pipe is next secured around the honeycomb material between the respective ends of the outer pipe of the respective lengths of reinforced pipe to complete the connection between the adjacent lengths of reinforced pipe. When constructing a submerged pipeline, these connections are made at the surface on a lay barge or similar vessel and the pipeline is continuously lowered to the marine bottom as the respective lengths are joined together.

BRIEF DESCRIPTION OF THE DRAWINGS

The actual construction operation, and apparent advantages of the present invention will be better understood by referring to the drawings, not necessarily to scale, in which like numerals identify like parts and in which.

BEST KNOWN MODE FOR CARRYING OUT THE INVENTION

Figure 1:
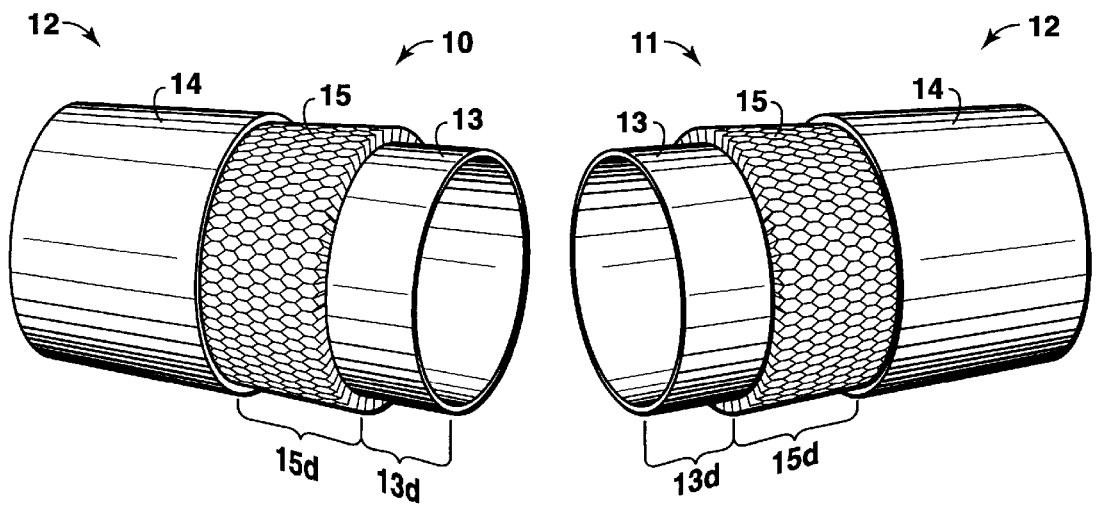
FIG. 1 is a perspective view of two joints of the reinforced pipe of the present invention before being joined.

Referring more particularly to the drawings, FIG. 1 illustrates two adjacent sections or joints 10, 11 of reinforced pipe 12 which is constructed in accordance with the present invention. Each section of pipe 12 is basically identical so only one will need to be explained in detail. Reinforced pipe 12 is comprised of an inner pipe 13, an outer pipe 14, and a layer of honeycomb, reinforcement material 15 therebetween. Inner pipe 13 has an inner diameter (ID) equal to the diameter of the desired submerged pipeline (e.g. 30 inches) which is to be constructed from a plurality of lengths or joints of pipe 12. Inner pipe 13 is preferably made in joints (e.g. 30-foot long lengths) or double joints (e.g. 60-foot lengths) and is comprised of basically the same type of standard, pipe which is routinely used to construct submerged pipelines in shallower water depths; e.g. API Grade X65 steel pipe or equivalent material having from a wall thickness of from about 0.75 to about 1.5 inches. As is known to those of ordinary skill in the art, standard pipes used to construct submerged pipelines, such as the API Grade X65 pipe and its equivalents, are non-perforated in that they substantially lack perforations and are substantially rigid and substantially cylindrical and have the capability of transporting fluids, i.e. liquids and gases.

Figure 3:
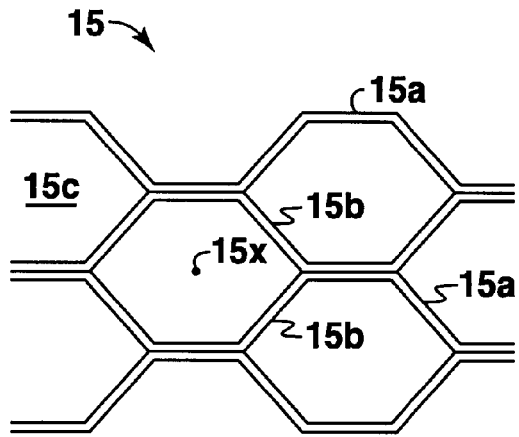
FIG. 3 is a top view, partly broken away, of the honeycomb material used as reinforcement in the pipe of FIG. 1.

The honeycomb material 15 which provides the reinforcement material between inner pipe 13 and outer pipe 14 may be fabricated in any number of ways. For example, two strips 15a, 15b, (FIG. 3) which when joined together form one row of cells 15c of the honeycomb material 15, can be produced simultaneously by using known cold stamping techniques. Stock (e.g. Grade X65 steel sheet material having a thickness of between about 40 thousandths and 80 thousandths of an inch is fed from a reel into two or more stamping dies (not shown) to form strips 15a, 15b, etc. (FIG. 3). Each of the dies creates one side of a segment of the honeycomb profile and simultaneously profiles the inner and outer edges to conform with the inner pipe 13 and outer pipe 14, respectively. Strips 15a and 15b are brought together and then secured together at their contact points by chemical bonding, welding, or the like and this procedure is repeated to form sections of the honeycomb material 15. Each section, comprised of several rows of honeycomb cells 15c, may then be positioned onto inner pipe 13 as shown in FIG. 1.

Figure 4:
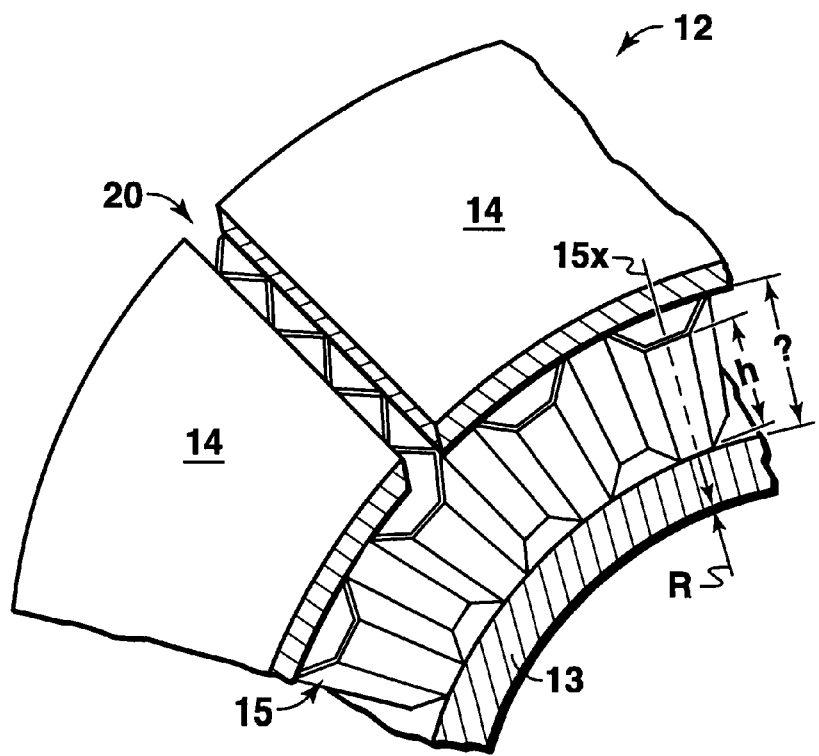
FIG. 4 is a perspective view, partly broken away, of a section of the reinforced pipe of the present invention illustrating one step in the method for making same.

It is important that each section of honeycomb material 15 is positioned onto inner pipe 13 so that the longitudinal axes 15x of each cell 15c of honeycomb material 15 is substantially perpendicular to the outer surface of inner pipe 13 (i.e. axes 15x are aligned with the radii R of pipe 13, see FIG. 4). The height "h" of material 15 will be determined by the width of the annulus "A" formed between inner pipe 13 and outer pipe 14 (e.g. 2.5 inches) whereby material 15 will extend completely through annulus A and contact both inner pipe 13 and outer pipe 14 when reinforced pipe 12 is assembled.

Figure 2:
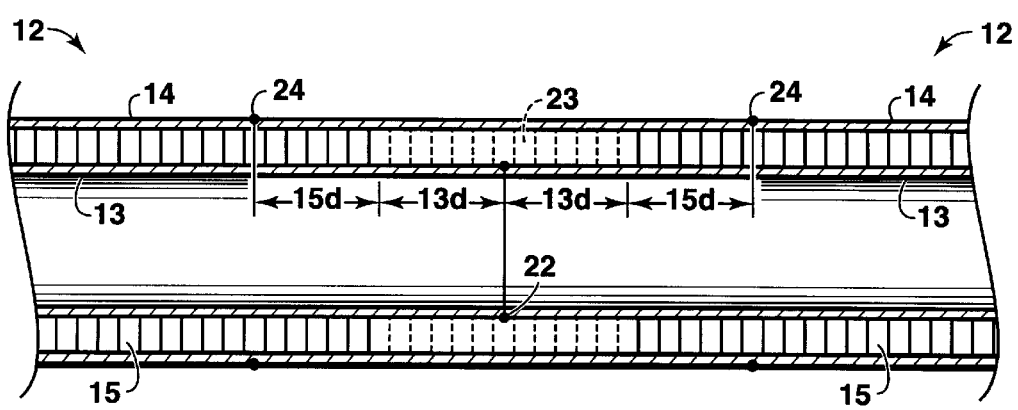
FIG. 2 is a longitudinal sectional view of the two joints of pipe of FIG. 1 after they have been joined together.

In some instances, the sections of the honeycomb material are formed into semicircular or half-shell sections (not shown) so that two of such sections can easily be fitted around inner pipe 13 and then joined along their seams, e.g. welded, etc., so that the honeycomb material will completely surround pipe 13. As seen in FIG. 1, preferably honeycomb material 15 does not extend along the full length of inner pipe 13 whereby a short length 13d of bare inner pipe 13 is exposed at either end (FIGS. 1 and 2) of each joint for a purpose described below.

Outer pipe 14 is basically a standard pipe, e.g. API Grade X65 steel pipe having an inner diameter (ID) of 34 inches with a wall thickness of about 1 inch. Pipe 14 can be positioned over honeycomb material 15 on inner pipe 13 in different ways. For example, a joint (30 feet, 12 meters, or similar length) or a double joint of inner pipe 13 having honeycomb material 15 thereon is stood on end, i.e. in a vertical position. Outer pipe 14 is first heated to about 400° C. which will expand the ID approximately 4 mm and is then lowered over the honeycomb material 15 on inner pipe 13. Upon cooling, outer pipe 14 will contract and tightly bind the honeycomb material 15 between pipes 13 and 14. This "shrink fit" will create some pre-hoop tension in the outer pipe which is beneficial when joints of the reinforced pipe 12 are assembled to form a submerged pipeline.

In most instances, outer pipe 14 may be formed in short lengths (e.g. 3–4 meters) and are shrunk fit onto honeycomb material 15 as individual short sections (not shown) rather than as one long outer pipe. The short sections are joined together (e.g. welded or the like) once they have been shrunk fit onto the honeycomb material. Also, preferably outer pipe 14 does not completely cover the entire length of honeycomb material 15 but leaves a short length 15d exposed at either end of the joint of reinforced pipe 12 (FIGS. 1 and 2) for a purpose described later.

Another method for constructing a joint of reinforced pipe 12 is similar to that described above except outer pipe 14 is split along its length on one side to form an open seam (see 20 in FIG. 4) whereby the outer pipe can be slightly spread to allow it to be fitted over honeycomb material 15 on inner pipe 13 without heating. Once in place, the outer pipe is allowed to spring back to its original shape to tightly enclose material 15 after which seam 20 is closed by welding or the like to form reinforced pipe 12.

To assemble a pipeline using a plurality of joints of pipe 12, the exposed lengths 13d of two adjacent joints are abutted and joined by weld 22 (FIG. 2) or the like. A short section 23 (shown by dotted lines in FIG. 2) of additional honeycomb material 15 is positioned over the joined, exposed sections 13a. For example, two half-shell sections of honeycomb material may be fitted around the joined sections 13a of inner pipes 13. Once honeycomb material 15 is in place, a short section 23 of additional outer pipe 14 (FIG. 2), split into two halves or half-shells which are later welded together, is fitted over the exposed honeycomb material and is secured at both ends by welds 24 to the ends of outer pipes 14 to complete the connection between joints of reinforced pipe 12.

Of course, as will be understood by those skilled in this art, the joining of adjacent lengths or joints of reinforced pipe 14 is carried out at the surface aboard a lay barge or similar vessel after which the joined pipeline is continuously lowered to the marine bottom using advanced pipeline laying techniques.

What is claimed is:

1. A length of reinforced pipe capable of withstanding large differentials in external and internal pressures, said reinforced pipe comprising:
   a non-perforated, substantially rigid and substantially cylindrical inner pipe capable of transporting a fluid;
   a non-perforated, substantially rigid and substantially cylindrical outer pipe concentrically positioned over said inner pipe to form an annulus therebetween; and honeycomb material comprised of rows of cells positioned in said annulus between said pipes, the longitudinal axis of each cell of said honeycomb material being aligned with the radii of both said inner and said outer pipes.

2. The length of reinforced pipe of claim 1 wherein said outer pipe is heat shrunk over said honeycomb material.

3. The length of reinforced pipe of claim 1 wherein said outer pipe is shorter than said inner pipe and is positioned on said inner pipe whereby each end of said inner pipe is exposed.

4. The length of reinforced pipe of claim 1 wherein said inner pipe is comprised of steel pipe having a wall thickness of from about 0.75 to about 1.5 inches.

5. The length of reinforced pipe of claim 4 wherein said outer pipe is comprised of steel pipe having a wall thickness of from about 0.5 to about 1 inch.

6. The length of reinforced pipe of claim 1 wherein said inner pipe is comprised of steel pipe having an inner diameter of about 30 inches and a wall thickness of from about 0.75 to about 1.5 inches; and said outer pipe is comprised of steel pipe having a inner diameter of about 34 inches and a wall thickness from about 0.5 to about 1 inch.

7. A method for constructing a length of reinforced pipe capable of withstanding large differentials in external and internal pressures, said method comprising:

positioning a honeycomb material which is comprised of rows of cells onto a length of a non-perforated, substantially rigid and substantially cylindrical inner pipe capable of transporting a fluid, and wherein the longitudinal axis of each cell of said honeycomb material is aligned with a radius of said inner pipe; and concentrically positioning a length of an outer pipe over said honeycomb wherein said honeycomb material is tightly confined between said inner pipe and said outer pipe, and wherein upon completion of said positioning step said outer pipe is non-perforated, substantially rigid and substantially cylindrical.

8. The method of claim 7 including:

heating said length of said outer pipe to expand its inner diameter before said outer pipe is positioned over said honeycomb material; and cooling said length of said outer pipe to thereby shrink said outer pipe into contact said honeycomb material on said inner pipe.

9. The method of claim 7 including:

splitting said outer pipe along its length on one side to form an open seam therein;

spreading said split outer pipe to effectively increase its inner diameter;

fitting said spread, outer pipe over said honeycomb material;

allowing said outer pipe to return to its original inner diameter whereby said outer pipe contacts said honeycomb material; and closing said seam to secure said outer pipe in its original configuration to tightly enclose said honeycomb material between said inner pipe and said outer pipe.

10. The method of claim 7 wherein said honeycomb material is positioned along only a portion of the length of said inner pipe and wherein said length of said outer pipe is shorter than said inner pipe and is positioned over said honeycomb material whereby each end of said inner pipe is exposed.

11. The method of claim 10 including:

securing two lengths of said reinforced pipe together wherein:

joining the respective exposed ends of said two lengths of said reinforced pipes together;

positioning additional honeycomb material around the joined, exposed ends of said two lengths of said reinforced pipes; and positioning and securing an additional length of said outer pipe over said additional honeycomb material.

12. The method of claim 11 wherein said additional length of said outer pipe is comprised of two half-shell sections which are positioned around said additional honeycomb material and then secured together.

13. The method of claim 11 wherein said joined lengths of said reinforced pipe forms a portion of a submerged pipeline and wherein said two lengths of said reinforced pipe are joined together before the joined lengths are lowered from the surface of a body of water onto the marine bottom.

\* \* \* \* \*